INVENTORS
Henry T. Dinkelkamp.
William G. Jennings

By John C. Black
ATTORNEY

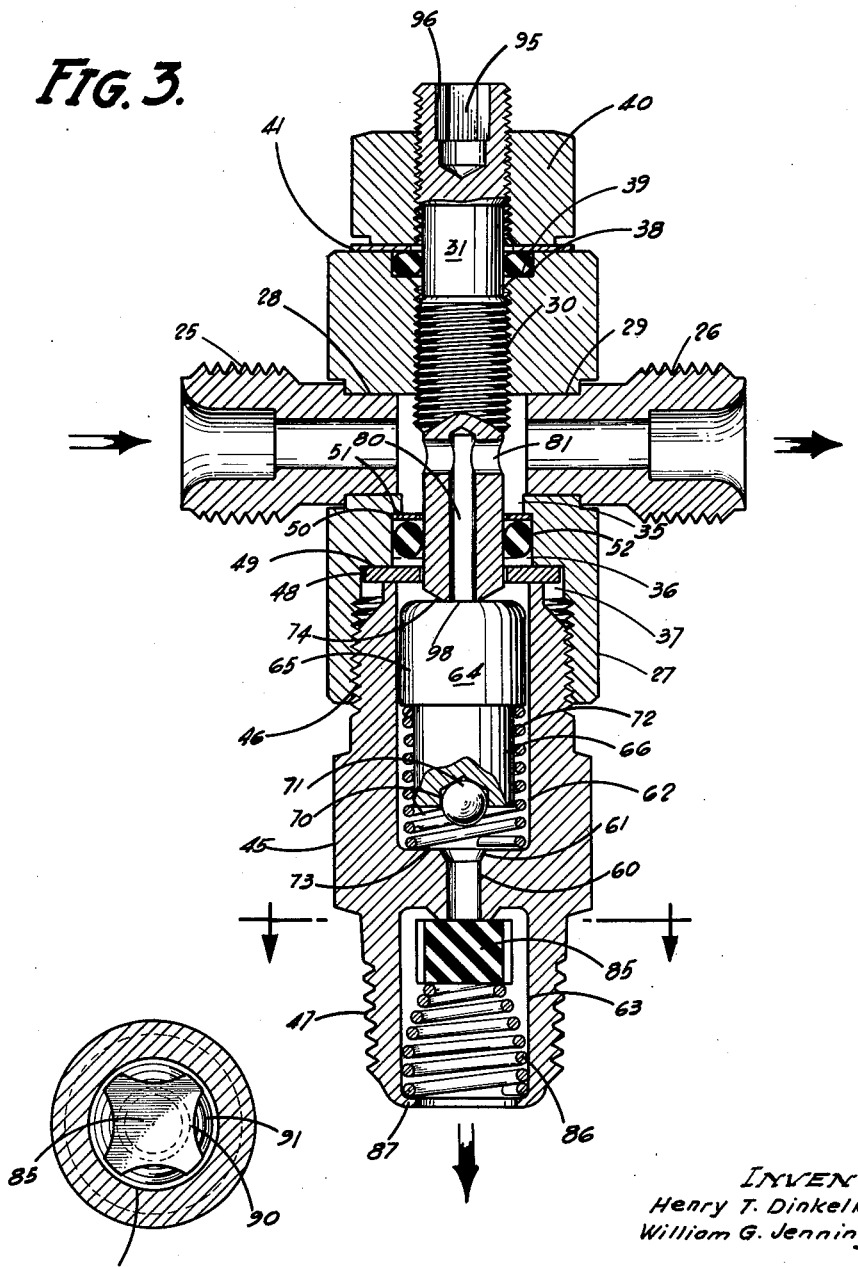

United States Patent Office 3,031,032
Patented Apr. 24, 1962

3,031,032
CENTRALIZED LUBRICATION SYSTEM AND ADJUSTING MEASURING VALVE THEREFOR
Henry T. Dinkelkamp, Mount Prospect, and William G. Jennings, Evanston, Ill., assignors to Stewart-Warner Corporation, Chicago, Ill., a corporation of Virginia
Filed June 17, 1959, Ser. No. 820,929
16 Claims. (Cl. 184—7)

This invention relates generally to centralized lubrication systems and more particularly to an improved system and valve for transferring infinitesimally small measured amounts of lubricant to bearing surfaces.

The improved valve and system have been especially adapted for lubricating the twister rings and spinner rings of textile twisting and spinning machinery. However, it is to be understood that the invention is to be limited only to the extent set forth in the appended claims. The twister and spinner rings are generally similar and have similar lubrication problems. Hence, reference will be confined to twister rings.

A typical textile twisting machine includes a large number of identical assemblies placed side by side and operated by a common power means. Each assembly comprises a generally annular twister ring, a coaxial shaft, a spindle rotatably carried by the shaft and rotated by the power means, and a traveler which rides around the inner peripheral surface of the ring at one end thereof. A typical machine will include in the order of 160 such assemblies.

A plurality of individual fiber strands are threaded through the traveler and connected to the spindle. When the spindle rotates on its shaft the fiber strands are twisted into thread and wound on the spindle. The traveler guides the thread as it rotates about the twister ring periphery to assure proper winding of the thread on the spindle. As the traveler is moved about the ring periphery by the rotating spindle and thread, it engages and wipes across the inner peripheral surface of the ring.

Lubrication of the twister ring and the traveler is required for proper operation of the spindle. This lubrication must be carefully controlled to assure even moderately acceptable operation of the spindle. Very minute amounts of lubricant, preferably oil, must be applied at very frequent intervals to maintain an optimum lubricant film on the ring.

Manual lubrication of textile machinery has long been the accepted practice. In accordance with this practice, an operator dabs lubricant on his finger and wipes his finger around the inner periphery of the ring at its outer end while the machine is shut down. It is across this latter surface that the traveler rides. This practice has been prevalent in spite of its rather obvious limitations. In the first place, it will be readily appreciated that the machine must be stopped in order to permit the manual lubrication thereof. Inasmuch as a typical machine may have as many as one-hundred sixty spindles, the shutdown time for complete lubrication of the entire machine is considerable.

The machines must be shut down to remove filled spindles and replace them with new spindles. Also the machines must be shut down to replace the fiber strand supply rolls. It is only during these shutdowns that many manufacturers provide for manual lubrication of the twister rings. However, only a portion of the rings can be lubricated during one such shutdown.

Unfortunately, the power consumption of these machines as presently lubricated is substantially in excess of that which is required in the event that theoretically perfect lubrication were achieved. Only an optimum lubricant film will permit maximum output speeds and minimum power consumption per unit of products. It has been determined that, with an optimum lubricant film on all rings at all times, the machines can run at least 25% faster with the same power input. The cost of the power for operating the machines is perhaps one of the most significant cost factors in the product. Thus, if proper lubrication is achieved, a substantially greater output can be realized with little increase in cost.

It has been further determined that optimum lubrication requires the application of very minute amounts of lubricant at regular short intervals of time. Subsequent to such time interval, the loading of the traveler on the ring rises to a significantly higher value. Since it is not practical to manually lubricate every ring at such intervals, for example three minutes, the average power consumption per unit of product rises substantially. For reasons to be discussed later, the problem cannot be alleviated by applying larger lubricant quantities at less frequent intervals.

In addition, inadequate lubrication of the ring will result in non-uniform loading on the traveler and a corresponding non-uniform thread. The increased loading on the traveler at times causes flipping of the traveler from the ring at high speed. This poses a serious hazard to employees. Reliable elimination of the hazard can be assured by the continuous existence of an optimum lubricant film on the ring.

As a result of the inadequacy of manual lubrication, the applicants' assignee and its competitors have attempted over the years to design a commercially acceptable centralized lubrication system. Such a system requires means for lubricating the rings at regular frequent intervals. It also requires that the amount of lubricant delivered to each twister ring be accurately measured. This will be brought out more clearly in the detailed description.

A commercially acceptable centralized lubrication system also requires an individual measuring valve for each twister ring. As a result, the cost of each measuring valve must be maintained as low as possible in view of the high number of spindles on each machine. This price must be maintained at an absolute minimum in order to assure an economical system installation. Otherwise the price of the system will outweigh its advantage. In addition, space limitations in each textile machine preclude the use of a massive, bulky measuring valve.

For at least twelve years the applicants' assignee and other suppliers of centralized lubrication equipment have been endeavoring with little success to solve this problem. One major roadblock has forestalled the success of their efforts, that is product contamination. It has been indicated above that a lubricant film must be maintained on the twister ring sufficient in amount to permit the theoretical optimum machine speeds and power consumptions. However, an excess amount of lubricant must not be applied to the twister rings. If an excessive amount of lubricant is applied to a ring, a portion of the excess lubricant touches and adheres to the fiber strands in the traveler. This lubricant contaminates the thread which is spun on the associated spindle.

In certain segments of the textile industry a certain amount of product contamination can be tolerated. However, even where it is tolerated, the resulting thread must be downgraded and the sales price of such thread is correspondingly reduced. In some instances, the contamination is so great that the thread must be washed or even rejected.

In at least one segment of the industry, however, no contamination whatsoever can be tolerated. In the spinning of nylon and rayon tire cord, even the slightest trace of lubricant on the thread may cause a subsequent failure of a vehicle tire in which the thread is used. The disastrous results and attendant liability for such a failure is at once apparent. Hence high manufacturing tolerances are adhered to for such cord, and very careful supervision and inspection of the material is maintained. In this particular segment of the industry, no fully satisfactory centralized lubrication system existed prior to that of applicants'.

Hence it can be seen that the designer of such lubricant equipment is faced with a dilemma. On the one hand, he must provide lubrication sufficient in amount at frequent enough intervals to assure an optimum lubricant film on the ring. On the other hand, he must maintain within severely restricted limits the amount of lubricant which is delivered to each ring each time it is lubricated. For example, desirable measured quantities of lubricant are often in the order of .0001 to .0032 cubic inch. In addition, this amount must be carefully controlled.

Prior to applicants' invention no truly satisfactory measuring valve could assure reliable control of such minute quantities. As indicated earlier, several attempts have been made to solve this problem especially for the nylon and rayon tire cord segment of the industry. This segment of the industry includes approximately a score of manufacturers; yet, over the past 20 years, there has been no penetration of this market by centralized lubrication systems. These attempts were characterized in many instances by devices which were not capable of measuring minute enough quantities and/or which were bulky and prohibitive in cost. What is of even more importance, however, is the fact that these prior art devices were not capable of reliably controlling the amount of the minute lubricant quantities measured.

In previous attempts to solve the twister ring lubrication problem, the applicants' assignee spent considerable time and effort in the development of an accumulator device which slowly discharges a large measuring quantity of oil into a ring over a period of time. This device proved to be too costly, bulky and inaccurate. Subsequently, it attempted to modify an oil mist system for the textile machinery. While minute quantities of oil could be measured by this latter system, the high air consumption and the resulting atmospheric contamination caused this approach to be abandoned. Finally, it attempted to use a newly developed fixed displacement valve operating on a principle similar to that of applicants' improved valve. This attempt, however, failed because the oil quantities delivered were excessive in amount and the amount measured by a group of valves varied over too wide a range.

Applicants' assignee abandoned all research on the problem for several years. Then recently applicants hit upon an idea which led to the first genuinely acceptable solution to the problem. The applicants utilized the previously unsuccessful fixed positive displacement valve. However, they provided an adjustable valve seat and adjusted the valve from an absolute zero displacement condition. It was discovered that by adjusting the valve seat from an absolute zero displacement condition, it was possible to cancel out the effect of all or substantially all of the manufacturing tolerances. As a result, economical mass production techniques could be utilized and the cost could be kept to a minimum.

It is, therefore, a primary object of the present invention to provide an improved system for lubricating twister and spinner rings in textile machinery.

Another primary object is the provision of an improved measuring valve for centralized lubrication systems.

A more specific object is the provision of an improved valve capable of delivering accurately measured minute quantities of lubricant.

Other objects and the numerous features of the present invention will be evident upon a perusal of the following description taken in conjunction with the attached drawings in which:

FIG. 3 is an enlarged elevation section of the improved valve; and

FIG. 4 is a sectional view along line 4—4 of FIG. 3.

Figure 1:
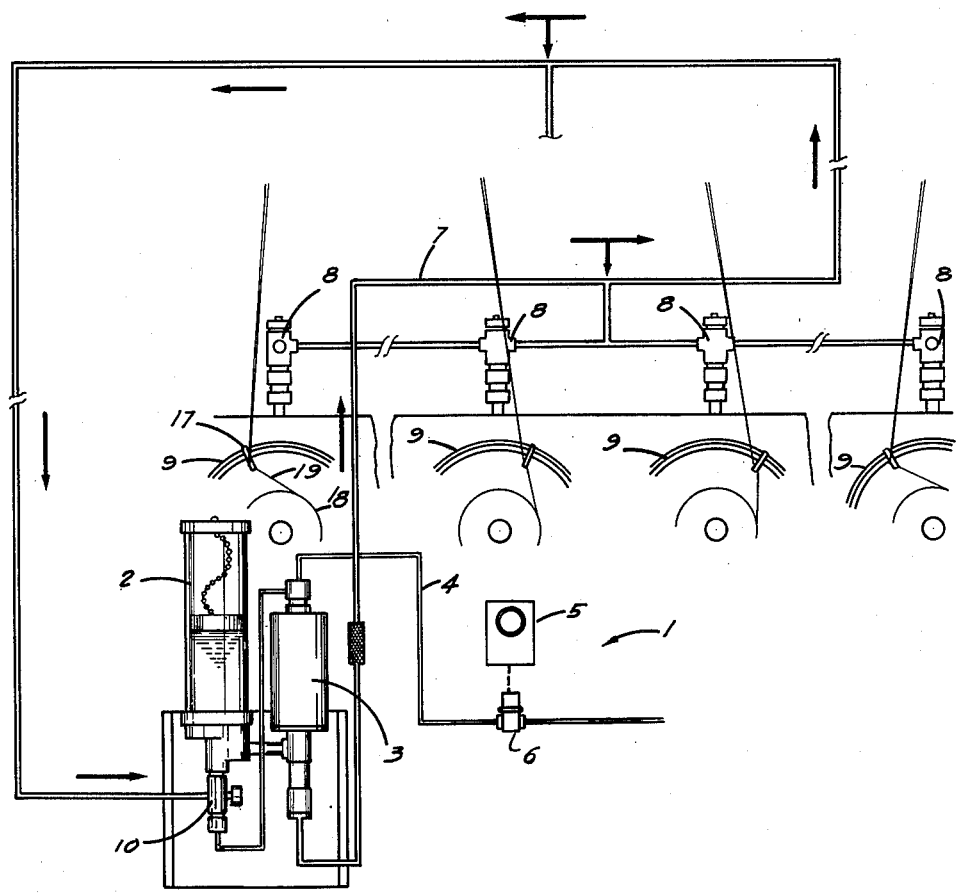
FIG. 1 is a diagrammatic view of the improved centralized system.

Briefly, the system 1 shown in FIG. 1 comprises an oil reservoir 2 and a lubricant pump 3. In the embodiment shown, the pump 3 is operated by air pressure supplied thereto by a line 4. A timer 5 controls a valve 6 to supply air to the pump 3 at regular intervals, for example every 3 minutes. The pump 3 supplies oil from the reservoir 2 to a lubricant line 7. Each time that the pump 3 is operated by the timer 5, it supplies lubricant to the line until a predetermined high pressure is produced. The timer subsequently closes the valve 6.

Figure 2:
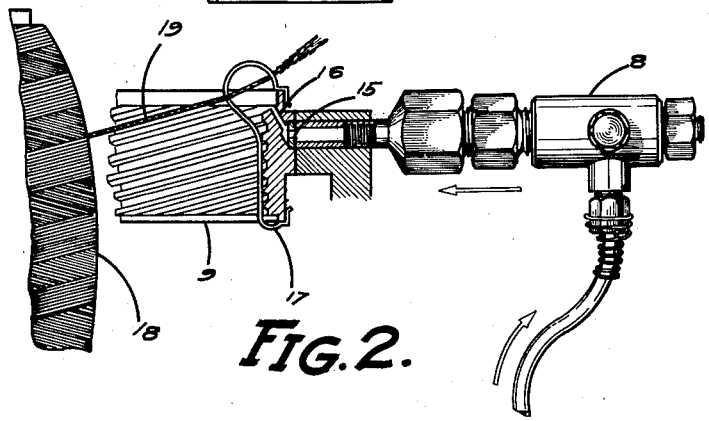
FIG. 2 is a partial elevation view of a twister ring with the improved valve secured thereto.

A plurality of measuring valves 8 are connected in parallel to the line 7 for receiving the high pressure oil. Each of the valves 8 is connected to a twister ring 9 for delivering measured amounts of oil to the ring each time that the line 7 is pressurized. The line 7 terminates in a conventional end-of-line valve 10. When the timer 5 operates the valve 6 to cut off the supply of air to the pump 3, it also cuts off the supply of air to the valve 10. The valve 10 then opens to vent the oil in the line 7 back to the reservoir 2. As best seen in FIG. 2, each measured quantity of oil delivered by a valve 8 is received in the twister ring 9 by way of apertures 15 and 16.

A traveler 17 is shown in FIG. 2 in the normal position it assumes against the ring 9 while it is being rotated with the spindle 18. A plurality of fiber strands 19 are received through the traveler 17 for spinning and winding on the spindle 18.

Improved valve 8 will now be described in detail. The embodiment shown in FIG. 3 is of the type having a pair of coaxial studs 25 and 26 disposed on diametrically opposite sides of the valve 8. The studs 25 and 26 are connected to and form a part of the lubricant line 7 as shown in FIG. 1.

The valve 8 comprises a generally annular body 27. The body includes transverse bores 28 and 29 into which the studs 25 and 26 are pressed. The upper end of the body 27 defines a threaded bore 30. An elongated screw 31 is threaded into the bore 30 and extends downwardly into a lubricant inlet bore 35 and succeeding counterbores 36 and 37. A counterbore 38 at the upper end of the body 27 receives an O-ring 39 to provide a seal between the screw 31 and the body. The screw is locked in an adjusted position by a lock nut 40. A washer 41 transposed between the lock nut and the body retains the O-ring.

The counterbore 37 is threaded at its lower end. A second screw 45 is threaded at its upper and lower ends 46 and 47. The upper end 46 is threaded into the counterbore 37. A washer 48 is engaged by the screw 45 and is held securely against a shoulder 49 defined by counterbores 36 and 37. An additional washer 50 is pressed into the counterbore 36 and is forced against a shoulder 51 defined by the counterbores 35 and 36. An O-ring 52 is received in the counterbore 36 between the washers 50 and 48. The O-ring is held in compression between the screw 31 and the body to provide a seal therebetween.

The screw 45 defines a bore 60. The upper end of bore 60 is formed outwardly into an inverted generally truncated conical valve seat 61. The screw 45 also defines a counterbore 62 above the bore 60 and a second counterbore 63 below the bore. The assembly comprising the body 27 and the screw 45 may be considered as a valve housing within which is disposed the operating parts of the valve for the purpose of definition in the appending claims. The counterbore 62 receives a piston 64 for reciprocation therein. The upper enlarged end 65 of the piston 64 has an outside diameter only slightly less than the diameter of the counterbore. The lower portion 66 of the piston is reduced in cross-section. A hole 70 is drilled into the lower end of the piston 64. A ball check 71 is pressed into the hole 70. The ball check 71 cooperates with the seat 61 to form a valve means. A spring 72 is received closely about the lower end 66 of the piston 64. The spring is held in compression between the enlarged upper portion 65 of the piston and a shoulder 73 defined by the bore 60 and the counterbore 62. The spring 72 normally urges the piston 64 upwardly into engagement with the lower end 74 of the screw 31.

The lower end of the screw 31 includes an axial passageway 80 and a transverse passageway 81 in communication with the upper end of the axial passageway. The passageways 80 and 81 are in fluid conducting relationship with the lubricant receiving counterbore 35. Hence any oil pressure in the line 7 is applied to the passageways 80 and 81. The piston 64 is urged by the spring 72 against the lower end of the passageway 80 to provide a seal.

An irregularly shaped rubber valve 85 is reciprocably received in the counterbore 63. A spring 86 urges the valve 85 into sealing relation with the lower end of the bore 60. The lower end of the second body portion 45 is curled over at 87 to retain the spring 86 in compression against the valve 85.

As best seen in FIG. 4, the rubber valve 85 is generally circular with four circumferentially spaced peripheral sections 90 cut away. Oil delivered by the valve 8 through its bore 60 passes freely through the spaces 91 between the sections 90 and the counterbore 63.

An opening 95 is provided in the upper end of the screw 31. The upper end 96 of the opening is hexagonal in cross-section for receiving an Allen wrench. The screw 31 and the body 27 have very fine mating threads, for example a No. 10 screw with 64 threads per inch, for adjusting the amount of lubricant to be discharged by the valve. The screw 31 is turned until the ball 71 goes solid against its seat 61. The screw is then carefully turned in the opposite direction a selected number of full and/or partial turns corresponding to the desired measured quantity.

In a typical mass produced commercial embodiment, the screw 31 is locked by the nut 40 at a precise setting with negligible backlash. The top surface of the measuring piston 64 is held parallel with the contacting surface 74 of the adjusting screw so that the clearance between the piston 64 and the screw contacting surface 74 is no greater than .001" at any point along the mating surfaces when the piston 64 is in its natural biased position.

The measuring piston itself is fit into the valve body with a predetermined clearance which is controlled in manufacturing to within .0030"–.00557". The ball check secured to the lower end of the measuring piston and its cooperating valve seat is held concentric to within approximately .001". Likewise the ball seat is made virtually leak proof when sealed against the ball by using a conical swaging tool with a controlled finish. The rubber discharge check is completely leak proof and is spring loaded to close at a carefully determined pressure below the discharge pressure and above the vent pressure of the valve. The valve components are assembled with a precise, measured torque to assure complete gasket sealing without distortion of the parts.

The assembly, testing, and packaging of the valve are carried out under conditions which assure a valve free of foreign material. These manufacturing tolerances are not severe and do not, therefore, result in a prohibitive cost.

In this commercial embodiment, each one eighth turn (45°) provides .0001 cubic inch of oil. This valve is adjustable from 0 to .0032 cubic inches. No unusual care must be taken for accurate adjustment in increments of .0001 cubic inch.

This precise measurement is accomplished in the commercial embodiment with a piston stroke in the order of .002" for each one eighth turn and with a maximum error in the order of .000025 cubic inch. This error is due to utilizing only reasonably close manufacturing tolerances for the thread adjustment means. It can be minimized even further or almost eliminated with special manufacturing tolerances. However, this error is fixed and unvarying for any one valve in all adjusted positions thereof. Hence, as the lubricant delivery is adjusted to higher values which are more commonly used in the industry, for example .0016, it can be seen that the maximum error for all valves is maintained at approximately 1%. At the full open position of the valve, the maximum possible error is less than 1% for all valves. It will be appreciated that this error occurs only because of the standard adjusting procedure of selecting the number of one eighth turns of the adjustment screw corresponding to the desired lubricant delivery. The lubricant delivery can be adjusted to the precise desired value without measurable error if it is desired to adjust the valve with a lubricant measuring device. However, this latter procedure is costly and impractical except perhaps for an infrequent special use.

The operation of the system 1 will now be described. As indicated earlier the timer 5 (FIG. 1) causes the initiation of a lubrication cycle at regular intervals. When the timer operates to open the valve 6 air under pressure is supplied to the pump 3 and to the end-of-line valve 10. The valve 10 closes to seal the end of the lubricant line 7. The pump 3 operates to pump oil from the reservoir 2 to the line 7. At the end of the previous lubrication cycle, a substantial amount of oil is retained in the line 7. However, the oil is at atmospheric pressure. Also portions of each of the valves 8 are filled or partially filled with oil. For example, the passages 80 and 81 and the counterbore 35 are at least partially filled with oil. The space between the enlarged upper end 65 of piston 64 and the valve 85 is completely filled with oil. The space above and around the end 65 will in most instances be substantially filled.

As the pump 3 delivers oil to the line 7, it first fills the entire line 7 and portions of the valves 8 in direct communication with the line 7. When all of this space is filled, the pressure of the lubricant therein begins to rise as the pump continues to operate. When a predetermined desired pressure is attained in the line 7, the valve 8 will be operated to discharge a measured amount of oil into its respective twister ring.

More specifically, the force of the high pressure oil on the exposed area 98 of the piston 64 is sufficient to overcome the force of the spring 72. The piston 64 is urged from sealing engagement with the lower end 74 of the screw 31. Immediately, the pressure of the lubricant in the line 7 is applied across the entire upper surface of piston 64. This force is extremely high in relation to the force of the spring 72. The ratio of these forces is the ratio of the piston area 98 under the bore 80 to the area of the entire upper surface of the piston 64. This high force moves the piston downwardly with a snap action to engage the ball check 71 on its seat 61.

During this movement of the piston 64, oil in the bore 60 and the counterbore 62 is forced ahead of the piston to unseat the valve 85 and flow into the counterbore 63. This result is due to the snap action of the valve and the very small clearance between the piston and the counterbore 62. No significant loss of oil around the periphery of the enlarged piston portion 65 is encountered. The valve 85 again seals the bore 60 as the ball check 71 seals the upper end of the bore 60. The amount of lubricant discharged into the counterbore 63 is determined by the diameter of the counterbore 62 and the length of the stroke of the piston.

In a predetermined time interval thereafter, the timer 5 closes the valve 6. The pump 3 stops and the end of line valve 10 vents the line 7. The pressure is thus relieved on the upper surfaces of the valve pistons such as 64. As the force of the oil on the upper portion of the piston 64 decreases below the force of spring 72 and toward zero force, the spring 72 urges the piston 64 slowly toward the screw 31. When the piston 64 is moved slowly, oil in the upper end of the counterbore 62 and in the passageways 80 and 81 will flow around the outer peripheral edge of the enlarged piston portion 65 to refill the space in the counterbore 62 with oil. Finally the piston 64 engages the screw 31 to seal the passageway 80, and the valve 8 is in good condition for the next cycle of operation.

An adjustable inlet valve seat with a fixed outlet valve seat has been found to present the most desirable commercial embodiment. However, it will be appreciated that the outlet valve seat can be made the adjustable seat.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. A lubricant measuring valve comprising a housing defining a chamber, a piston received in the chamber and having a controlled peripheral clearance with the chamber, an inlet valve for the chamber including a small portion of one end of the piston, an outlet valve for the chamber including the opposite end of the piston, a spring urging the piston to an inlet valve closing position thereof, structure extending from the chamber supporting at least one valve seat for one of said valves, said structure being translatable with respect to said housing to provide adjustment of at least one of said valves relative to the other from a position in which both valves are simultaneously closed for zero piston displacement to a position in which both valves are spaced a predetermined maximum distance from each other for maximum piston displacement, and an additional check valve downstream of the outlet valve.

2. A lubricant measuring valve comprising a housing defining a chamber, a piston received in the chamber and having a controlled peripheral clearance with the chamber, an inlet valve for the chamber including a screw threaded through the housing and extending into the chamber and including a small central portion of one end of the piston, the end of the screw extending into the chamber having a central longitudinal inlet passage covered by the piston portion in an inlet valve closing position thereof, an outlet valve for the chamber including the opposite end of the piston, a spring urging the piston to the inlet valve closing position, the screw being axially adjustable from a position in which both valves are simultaneously closed for zero piston displacement to a position in which both valves are spaced a predetermined maximum distance from each other for maximum piston displacement, and an additional check valve downstream of the outlet valve.

3. A lubricant measuring valve comprising housing structure defining a chamber, a piston of a non-resilient material received in the chamber and having a controlled peripheral clearance with the chamber, the housing structure having a fine threaded bore upstream of the chamber, a screw having a fine threaded portion received in the housing structure and mating with the threaded bore, the screw having a portion with an inlet valve bore extending into the chamber, an outlet valve for the chamber including one end of the piston, a spring normally urging a small portion of the other end of the piston into sealing engagement with the inlet valve bore, the screw being axially adjustable from a position in which both valves are simultaneously closed for zero piston displacement to a position in which both valves are spaced a predetermined maximum distance from each other for maximum piston displacement, and an additional check valve downstream of the outlet valve.

4. In a measuring valve of the type in which a piston in a chamber is moved rapidly from sealing engagement with one valve seat to sealing engagement with another valve seat to force a measured amount of lubricant ahead of the piston through the latter valve seat, the combination with the piston and valve seats of structure extending from the chamber supporting at least one of said valve seats, said structure being translatable with respect to said chamber to provide adjustment for positioning the valve seats a desired distance relative to each other from an initial minimum spaced position in which the piston simultaneously sealingly engages both valve seats.

5. In a measuring valve of the type in which a piston in a chamber is unseated from an inlet valve seat by lubricant at a predetermined high pressure acting on a small portion of the piston area and is moved rapidly to a second position by the lubricant acting on a larger piston area to force a measured amount of lubricant ahead of the piston through an outlet valve and sealingly engage an outlet valve seat and in which a spring urges the piston slowly to its seating position on the inlet valve upon venting of the lubricant pressure to permit lubricant to flow around the piston to refill the measuring portion of the chamber, the combination with the piston of structure extending from the chamber supporting at least one of said valve seats, said structure being translatable with respect to said chamber to provide adjustment for positioning the inlet and outlet valve seats a desired distance relative to each other from an initial minimum spaced position in which the piston simultaneously sealingly engages both valve seats for accurately measuring the amount of lubricant discharged by the valve.

6. A lubricant measuring valve comprising housing structure having a cylindrical chamber, a metallic piston received for reciprocation in the chamber and having at least one elongated cylindrical portion with a controlled small peripheral clearance with an adjacent portion of the wall of the chamber, a screw having a fine thread and extending into one end of the chamber, structure including a mating threaded bore receiving and supporting the screw in alignment with the piston, the end of the screw facing the piston having an opening forming a first valve seat, the ends of the screw and piston facing each other being formed perpendicular to the piston axis for sealing engagement of the first valve seat and the piston in one operating position thereof, structure having an axial opening forming a second valve seat at the other end of the chamber, the piston having a coaxial curved surface at its other end mated with and sealingly engaging the second valve seat in another operating position of the piston, one of the valve seats and the piston defining an inlet valve adapted for connection with a source of lubricant and the other valve seat and the piston defining an outlet valve, the cross-sectional area of the inlet valve seat being small in relation to the cross-sectional area of the elongated portion of the piston, a spring in the chamber normally urging the piston into sealing engagement with the inlet valve seat, lubricant from the source at a high pressure rapidly moving the piston into sealing engagement with the outlet valve seat, to discharge a measured lubricant quantity from the chamber, an additional check valve downstream of the outlet valve seat, the screw being axially adjustable by angular displacement thereof from a position in which the inlet and outlet valve seats are simultaneously sealed by the piston for zero piston displacement to a position in which both valve seats are spaced a greater distance from each other for maximum piston displacement, whereby minute quantities of lubricant may be accurately measured for discharge from the chamber by predetermined angular displacement of the screw from its zero piston displacement position.

7. The combination claimed in claim 6 together with a locking nut for retaining the screw in an adjusted position.

8. A lubricant measuring valve comprising housing structure having a cylindrical chamber, a metallic piston assembly having a ball carried axially in fixed position at one end thereof and received for reciprocation in the chamber, the piston assembly having at least an elongated cylindrical portion with a controlled small peripheral clearance with the wall of the chamber, a screw having a fine thread and extending into one end of the chamber, structure including a mating threaded bore receiving and supporting the screw in coaxial relationship with the piston assembly, the end of the screw facing the piston assembly having an axial opening forming a first valve seat, the ends of the screw and piston assembly facing each other being formed perpendicular to the piston assembly axis for sealing engagement of the first valve seat and the piston assembly end in one operating position of the assembly, structure having an axial opening forming a second valve seat at the other end of the chamber, the ball sealingly engaging the second valve seat in another operating position of the piston assembly, one of the valve seats and the piston assembly defining an inlet valve adapted for connection with a source of lubricant and the other valve seat and the piston assembly defining an outlet valve, the cross-sectional area of the inlet valve seat being small in relation to the cross-sectional area of the elongated portion of the piston assembly, a spring in the chamber urging the piston assembly into sealing engagement with the inlet valve seat in one operating position thereof, lubricant from the source at a high pressure rapidly moving the piston assembly into sealing engagement with the outlet valve seat to discharge a measured lubricant quantity from the chamber, an additional check valve downstream of the outlet valve seat, the screw being axially adjustable by angular displacement thereof from a position in which the inlet and outlet valve seats are simultaneously sealed by the piston assembly for zero piston assembly displacement to a position in which both valve seats are spaced a greater distance from each other for maximum piston assembly displacement, whereby minute quantities of lubricant may be accurately measured for discharge from the chamber by predetermined angular displacement of the screw from its zero piston assembly displacement position.

9. A lubricant measuring valve comprising housing structure having a cylindrical chamber, a metallic piston received for reciprocation in the chamber and having at least an elongated cylindrical portion with a controlled small peripheral clearance in the order of .004" with the wall of the chamber, a screw having in the order of 64 threads per inch and extending into one end of the chamber, structure including a mating threaded bore receiving and supporting the screw in coaxial relationship with the piston, the end of the screw facing the piston having an axial opening forming a first valve seat, the ends of the screw and piston facing each other being formed parallel to each other and perpendicular to the piston axis for sealing engagement of the first valve seat and the piston in one operating position of the piston, structure having an axial opening with a conical surface forming a second valve seat at the other end of the chamber, the piston having a spherical surface at its other end concentric with the second valve seat within limits in the order of .001" for sealingly engaging the second valve seat in another operating position of the piston, one of the valve seats and the piston defining an inlet valve adapted for connection with a source of lubricant and the other valve seat and the piston defining an outlet valve, the cross-sectional area of the inlet valve seat being small in relation to the cross-sectional area of the elongated portion of the piston, a spring in the chamber urging the piston into sealing engagement with the inlet valve seat, lubricant from the source at a high pressure rapidly moving the piston from the inlet valve seat into sealing engagement with the outlet valve seat to discharge a measured lubricant quantity from the chamber, an additional check valve downstream of the outlet valve seat, the screw being axially adjustable by angular displacement thereof from a position in which the inlet and outlet valve seats are simultaneously sealed by the piston for zero piston displacement to a position in which both valve seats are spaced a greater distance from each other for maximum piston displacement, whereby minute quantities of lubricant may be accurately measured for discharge from the chamber by predetermined angular displacement of the screw from its zero piston displacement position.

10. A lubricant measuring valve comprising housing structure having a cylindrical chamber, a metallic piston received for reciprocation in the chamber and having at least an elongated cylindrical portion with a controlled small peripheral clearance with an adjacent portion of the wall of the chamber, a screw having a fine thread and extending into one end of the chamber, structure including a mating threaded bore supporting the screw generally in alignment with the piston, the end of the screw facing the piston having an opening defining an inlet valve seat adapted for connection with a source of lubricant, the cross-section area of the inlet valve seat being small in relation to the cross-sectional area of the elongated portion of the piston, the ends of the screw and piston facing each other being formed substantially perpendicular to the piston axis for sealing engagement of the piston with the inlet valve seat, a spring in the chamber urging the piston into sealing engagement with the inlet valve seat, aperture structure at the other end of the chamber defining an outlet valve seat, a metallic ball rigidly received in the other end of the piston in coaxial relationship with and sealingly engaging the outlet valve seat in an outlet valve closing position of the piston, an additional check valve downstream of the outlet valve seat, the screw being axially adjustable by angular displacement thereof from a position in which the inlet and outlet valve seats are simultaneously sealed for zero piston displacement to a position in which both valve seats are spaced a maximum distance from each other for maximum piston displacement, whereby minute quantities of oil may be accurately measured for discharge from the chamber by predetermined angular adjustment of the screw from its zero piston displacement position.

11. The combination claimed in claim 10 together with a nut for locking the screw in an adjusted position thereof.

12. A lubricant measuring valve comprising housing structure having a cylindrical chamber, a metallic piston received for reciprocation in the chamber and having at least an elongated cylindrical portion with a controlled small perpiheral clearance with an adjacent portion of the wall of the chamber, a screw having a fine thread and extending into one end of the chamber, structure including a mating threaded bore supporting the screw in coaxial relationship with the piston, the end of the screw facing the piston having an axial opening defining an inlet valve seat adapted for connection with a source of lubricant, the cross-section area of the inlet valve seat being small in relation to the cross-sectional area of the elongated portion of the piston, the ends of the screw and piston facing each other being formed substantially perpendciular to the piston axis for sealing engagement of the piston with the inlet valve seat, a spring in the chamber urging the piston into sealing engagement with the inlet valve seat, aperture structure at the other end of the chamber defining an outlet valve seat coaxial with the piston, a metallic ball rigidly received in the other end of the piston in coaxial relationship with and sealingly engaging the outlet valve seat in an outlet valve closing position of the piston, an additional check valve downstream of the outlet valve seat, the screw being axially adjustable by angular displacement thereof from a position in which the inlet and outlet valve seats are simultaneously sealed for zero piston displacement to a position in which both valve seats are spaced a maximum distance from each other for maximum piston displacement, whereby minute quantities of oil may be accurately measured for discharge from the valve chamber by predetermined angular adjustment of the screw from its zero piston displacement position.

13. A lubricant measuring valve comprising housing structure having a cylindrical chamber, a metallic piston received for reciprocation in the chamber and having at least an elongated cylindrical portion with a controlled small peripheral clearance in the order of .004" with the wall of the chamber, a screw having a fine thread in the order of 64 threads per inch extending into one end of the chamber, structure including a mating threaded bore supporting the screw in coaxial relationship with the piston, the end of the screw facing the piston having an axial opening defining an inlet valve seat adapted for connection with a source of lubricant, the cross-section area of the inlet valve seat being small in relation to the cross-sectional area of the elongated portion of the piston, the ends of the screw and piston facing each other being formed parallel to each other and perpendicular to the piston axis for sealing engagement of the piston with the inlet valve seat, a spring in the chamber urging the piston into sealing engagement with the inlet valve seat, aperture structure at the other end of the chamber defining an outlet valve seat coaxial with the piston, a metallic ball rigidly received in the other end of the piston in coaxial relationship with and sealingly engaging the outlet valve seat in an outlet valve closing position of the piston, an additional check valve down stream of the outlet valve seat, the screw being axially adjustable by angular displacement thereof from a position in which the inlet and outlet valve seats are simultaneously sealed for zero piston displacement to a position in which both valve seats are spaced a maximum distance from each other for maximum piston displacement, whereby minute quantities of oil may be accurately measured for discharge from the chamber by predetermined angular adjustment of the screw from its zero piston displacement position.

14. In a positive displacement centralized lubrication system of the type in which a distribution line extends from a source of lubricant to positions adjacent surfaces to be lubricated, in which means are provided for cyclically supplying lubricant from the source to the line under pressure and relieving the pressure and in which a measuring valve is connected to the line in each position and each valve includes a piston which responds to a predetermined line pressure to rapidly move in a measuring cylinder into sealing engagement with an outlet valve seat discharging a measured quantity of lubricant ahead of it and a spring effective upon a reduction in line pressure for slowly returning the piston into engagement with the inlet valve seat permitted flow of lubricant past the piston to refill the cylinder, the combination with each valve of means supporting on of the valve seats for adjustment by predetermined movement of the means from a zero discharge position in which the piston sealingly engages both valve seat simultaneously to a desired position corresponding to a selected quantity of lubricant to be measured and discharged.

15. In a positive displacement centralized lubrication system of the type in which a distribution line extends from a source of lubricant to positions adjacent surfaces to be lubricated and in which means are provided for cyclically supplying lubricant from the source to the line under pressure and relieving the pressure, the combination with the line and means of a plurality of measuring valves each connected to the line in one of the positions and each including a measuring cylinder having inlet and outlet valve seats adjacent opposite ends thereof, a piston of incompressible material received for reciprocation in the cylinder, having a peripheral clearance with the cylinder wall in the order of .003" and adapted for sealing engagement with the valve seats, means biasing the piston toward the inlet valve seat, an outlet check valve downstream the outlet valve seat, and means supporting one of the valve seats for adjustment by predetermined movement of the means from a zero discharge position in which the piston sealingly engages both valve seats simultaneously to a desired position corresponding to a selected quantity of lubricant to be measured.

16. In a positive displacement centralized lubrication system of the type in which a distribution line extends from a source of lubricant to positions adjacent surfaces to be lubricated and in which means are provided for cyclically supplying lubricant from the source to the line under pressure and relieving the pressure, the combination with the line and means of a plurality of measuring valves each connected to the line in one of the positions and each including a measuring cylinder having a planar inlet valve seat and a generally conical outlet valve seat adjacent opposite ends thereof, a piston of incompressible material received for reciprocation in the cylinder, having a peripheral clearance with the cylinder wall in the order of .003" to .006", having an inlet valve seat engaging surface parallel with the inlet valve seat, and concentric with the outlet valve seat within limits in the order of .001", means biasing the piston toward the inlet valve seat, an outlet check valve downstream the outlet valve seat, the inlet valve seat being formed at one end of an apertured screw having in the order of 64 threads per inch, and a threaded aperture means supporting the screw for adjustment of the inlet valve seat by predetermined angular movement of the screw from a zero discharge position in which the piston sealingly engages both valve seats simultaneously to a desired position corresponding to a selected quantity of lubricant to be measured with maximum error in the order of .000025 cubic inch.

References Cited in the file of this patent

UNITED STATES PATENTS

| | | |
|---|---|---|
| 1,803,601 | Davis | May 5, 1931 |
| 2,368,808 | Davis | Feb. 6, 1945 |
| 2,480,549 | Cashion | Aug. 30, 1949 |
| 2,532,269 | Davis | Nov. 28, 1950 |
| 2,616,523 | Davis | Nov. 4, 1952 |
| 2,622,698 | Chew | Dec. 23, 1952 |
| 2,804,241 | McDowall et al. | Aug. 27, 1957 |
| 2,867,076 | Atwood | Jan. 6, 1959 |